United States Patent [19]
Foster et al.

[11] 4,147,424
[45] Apr. 3, 1979

[54] RADIATION DISCRIMINATION SYSTEM

[75] Inventors: L. Curtis Foster, Atherton; John P. Lindley, Redwood City, both of Calif.

[73] Assignee: Itek Corporation, Lexington, Mass.

[21] Appl. No.: 609,994

[22] Filed: Jan. 16, 1967

[51] Int. Cl.² .............................................. G01B 9/02
[52] U.S. Cl. ................................... 356/352; 356/346; 329/144
[58] Field of Search .................... 250/199; 88/14 I; 350/166, 163; 329/144; 356/112, 352

[56] References Cited
U.S. PATENT DOCUMENTS

| | | | |
|---|---|---|---|
| 1,792,766 | 2/1931 | Schröter | 88/14 I |
| 2,385,086 | 9/1945 | D'Agostino et al. | 88/14 I |
| 2,410,502 | 11/1946 | Hurley | 88/14 I |
| 3,035,492 | 5/1962 | Blythe | 88/14 I |
| 3,040,583 | 6/1962 | Post | 88/14 I |
| 3,295,808 | 1/1967 | Webb | 88/14 I |

OTHER PUBLICATIONS

Rack et al, "A Technique for Measuring Small Optical Loss Using an Oscillating Spherical Mirror Interferometer," The Bell System Technical Journal, vol. XLIII, No. 4, Jul. 1964, pp. 1563-1579.

*Primary Examiner*—Nelson Moskowitz
*Attorney, Agent, or Firm*—Homer O. Blair; Robert L. Nathans

[57] ABSTRACT

A system for detecting the presence of coherent radiation comprises an interference filter having a pair of partially-reflective mirrors. The spacing between the mirrors is varied in accordance with a sine function to change the transmission wavelength of the mirrors. A reference signal is developed which represents this periodic variation in the spacing of the mirrors. A photodetector on the output side of the filter detects radiation transmitted therethrough, yielding a detection signal in the presence of coherent radiation transmitted through the filter. An indicator responds to the signal output of the photodetector and to the reference signal to produce an identifying indication of the detected radiation.

7 Claims, 4 Drawing Figures

Inventors
L. CURTIS FOSTER
JOHN P. LINDLEY

By *Dugla H. Drake*
Attorney

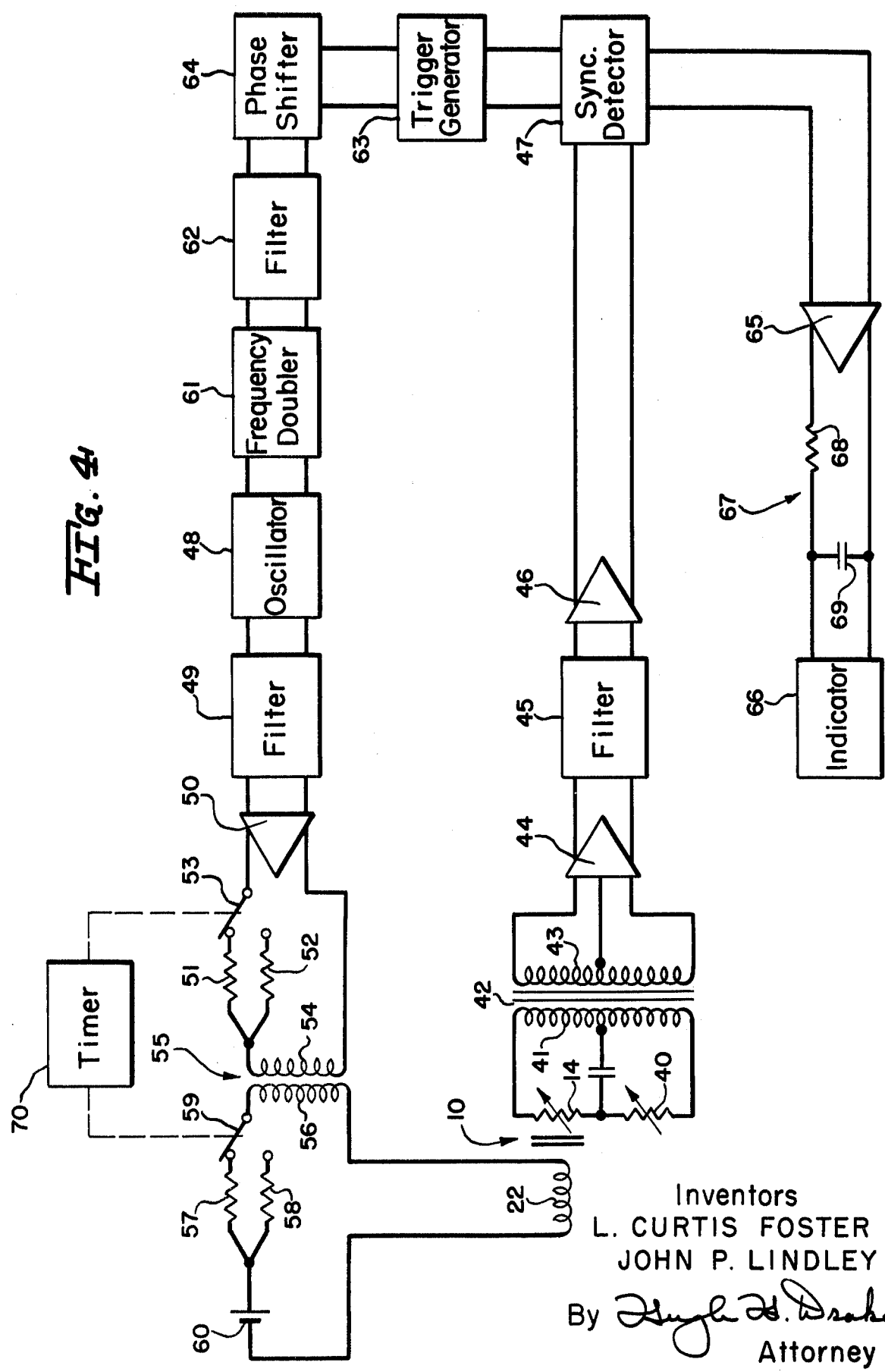

RADIATION DISCRIMINATION SYSTEM

The present invention pertains to a coherent radiation discrimination system. More particularly, it relates to a system capable of detecting and indicating the presence of coherent light such as that produced by a laser.

With increased usage of lasers, it has become desirable for a number of different reasons to be able to detect and indicate the presence of laser radiation in a given place. For example, considerable concern has been expressed in the literature with respect to the damage which may occur to the eyesight of a person who inadvertently looks into a laser beam. In a factory environment, a number of lasers may be operating throughout the facility and, as a practical matter, it may be difficult to limit access to the facility only to those thoroughly cognizant of the danger and knowledgeable as to the location of the lasers. Different ones of the lasers may be in use at any given time and certain of them may be operated only occasionally so that not all personnel are made constantly aware of their existence. The hazard is analogous to that in using X-rays.

Of course, various danger alarms or signals may be paralleled with the primary switch of each laser, but even these are subject to being disconnected in connection with routine maintenance, movement of the lasers to different positions, and so forth. Accordingly, it is desirable to have an indication system completely independent of the laser itself and of its control apparatus.

Moreover, presently available lasers operate at a number of different and comparatively widely-separated wavelengths. Typical examples are those operating at 0.6328, 0.848, 1.06, 1.08 and 1.15 microns. Further complicating the situation is the fact that some lasers, such as those operating at the last three wavelengths mentioned, produce light only in the infrared spectrum which is not visible to the human eye. This renders it necessary to be able to detect laser light over a wide spectrum and in both the visible and invisible portions thereof.

An individual who has complete control over the laser in question may employ any of several known techniques to provide a warning in a given area that the laser is operating. As one example, it is known to the art to derive a sample from the laser beam against which protection is desired and feed it to a photo-detector to which the beam from a second laser also is applied. The latter laser in this case may be essentially completely shielded so as to avoid any problem with its radiation. The detector in effect heterodynes the two light beams and develops an output signal equal to any difference in frequency or phase between the respective beams. This output signal then can be utilized for an indicator or alarm. However, such a system is of no avail when the laser against which protection is needed is operated by a third party. With increasing power available from lasers, it is possible to cause a laser beam to travel substantial distances as from one portion of a factory to another or even possibly into a neighboring building. Thus, to provide complete protection in all of these different situations, it is necessary that the detection system to be employed be completely independent from the laser protected against, be capable of detecting laser light at a variety of wavelengths and directions, be sufficiently sensitive to detect even very small amounts of laser light power and be capable of distinguishing from a wide variety of background radiation.

It accordingly is a general object of the present invention to provide a radiation discrimination system which avoids all of the problems noted while achieving all of the desired ends mentioned.

A more specific object of the present invention is to provide a system for detecting coherent radiation and for indicating its presence only on the basis of its coherency.

A further object of the present invention is to provide a system capable of achieving the foregoing aims and objectives and yet which is comparatively simple of manufacture and operation.

A radiation discrimination system in accordance with the present invention includes a spaced pair of parallel partially reflective mirrors which together define an interference filter for radiation of predetermined wavelength and direction dependent upon the spacing between the mirrors. Coupled to at least one of the mirrors is a driving source for varying the spacing between the mirrors and correspondingly varying the transmission wavelength of the filter for a given incidence angle. Disposed to one side of the interference filter is a detector responsive to radiation transmitted by the filter for developing a detection signal. Finally, the system includes means responsive to the detection signal and a signal representative of the action of the driving source for developing an indication effect only upon transmission through the interference filter of coherent radiation.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIG. 4 is a schematic diagram of an embodiment alternative to that of FIG. 3.

Figure 1:
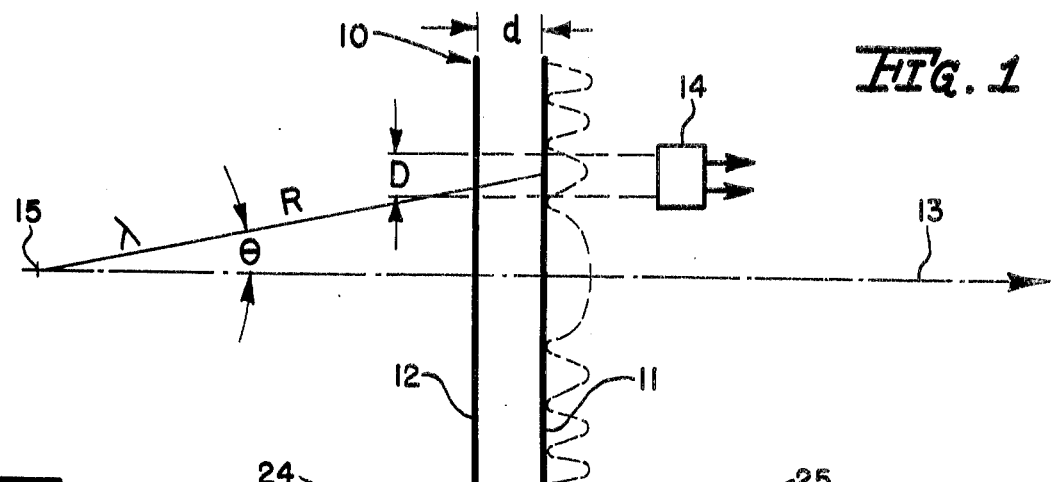
FIG. 1 is a schematic diagram of a simplified embodiment of a light discrimination system.

In FIG. 1, an interference filter 10 is composed of a pair of partially-reflective parallel mirrors 11 and 12 spaced apart by a distance d and for purposes of explanation symmetrical about an axis of normal incidence 13. Mirrors 11, 12 are movable relatively toward or away from one another while maintaining parallelism. Disposed outwardly from mirror 11 is a detector 14 capable of developing an electrical signal in response to light from a spot 15 transmitted through a section of interference filter 10 having a diameter D. Spot 15 represents an area of light reflected or scattered from a diffuse surface such as the interior wall surface of a building. The light scattered from spot 15 is coherent, having been produced by a laser beam.

As is well known, an interference filter usually is constructed of mirrors having an extremely high reflectivity. Light is transmitted through the filter only when the spacing between the mirrors and the index of refraction of any material therebetween is such that the effective optical path length through the filter is one-half the wavelength of the light or an integral multiple thereof. Such a conventional interference filter has response transmission peaks which are extremely narrow in terms of wavelength. However, as used in the systems herein to be described, mirrors 11, 12 preferably have a much lower reflectivity than typical as a result of which the transmission response peaks are substantially broadened. With the individual mirror reflectance of the order of 40 percent, for example, a plot of the optical transmission power against wavelength for a fixed spacing d, or against the spacing d for a fixed wavelength, reveals a somewhat sinusoidally shaped curve varying between approximately 100 percent transmission and a percentage transmission the same as would be obtained when no interference effects are present so that the mirrors merely attenuate the light.

When coherent light from spot 15 falls upon interference filter 10, light transmitted through the filter appears in a pattern composed of a central disc surrounded by a plurality of rings of successively increasing diameter. As discussed in *Fundamentals of Optics* by Jenkins and White, Third Edition, McGraw-Hill Book Co., Inc. (1957) p. 277, the points of maximum transmission in the ring pattern are consistent with the expression:

$$m\lambda = 2d \cos \theta, \quad (1)$$

where m is the order of the ring, $\lambda$ is the wavelength of the light in microns, and $\theta$ is the angle between axis 13 and the direction of the incident radiation. A typical response pattern of the rings is illustrated by dashed undulating curve to the right of mirror 11 in FIG. 1. To illustrate the relationships involved, with mirrors 11 and 12 having equal reflectances of one-half, assume they are separated by a distance d of 100 wavelengths of the incident radiation which has a wavelength of 1 micron. Thus, for 100 wavelengths the mirror separation is about 4 mils. From equation (1) it is determined that on axis 13 ($\theta = 0$) the central disk is of the 200th order. It may be noted that the order m goes to smaller integers in the direction lateral to axis 13; that is, the next bright ring in the output pattern corresponds to an m of 199. This indicates that the diameter of the central disk subtends an angle from the source such that $\cos \theta = 199/200$.

With the radiation from spot 15 traveling a distance R to the interference filter, the ratio R/D represents the f number of the detector in object space. This value is also equal to $1/d\theta$. Thus, for a detector diameter D of 2 cm and a distance R of 10 feet or 300 cm, the f number is the comparatively large value of 150. The first derivative of equation (1) is:

$$\delta m = (-2d/\lambda) \sin \theta \delta \theta \quad (2)$$

For detection of a sector of a single band by the detector placed off axis 13, $\delta m = -1$. From equation (2), it is found that the maximum angle for which this illustrative device is effective is in terms of a value for $\theta$ in the order of ±48°. Even though this is a relatively large field of view, it will be seen hereafter that the approach is capable of enabling a still much larger field of view. The figures given heretofore are used only for convenience of basic illustration.

The ring patterns are developed in the output of the interference filter only if the light is coherent at a wavelength in a transmissive region of the filter response curve. Consequently, the filter inherently discriminates against ordinary incoherent background light. In order to detect the presence of coherent light in the field of view, the mirror separation d is varied by at least one-half the wavelength of light throughout the spectral region under observation. In practice, the actual physical distance between the mirrors need not be changed. Instead, the spacing may be effectively varied by altering the refractive index of a material between the mirror surfaces. It is known that this can be accomplished by forming the mirrors on opposing surfaces of an electrooptic dielectric material across which an electric field is applied. The index of refraction in such a material varies as the magnitude of the field is changed. Other materials respond in a similar manner to heat. It is also possible to instantaneously change the thickness of the material by launching acoustic waves into it.

Figure 2:
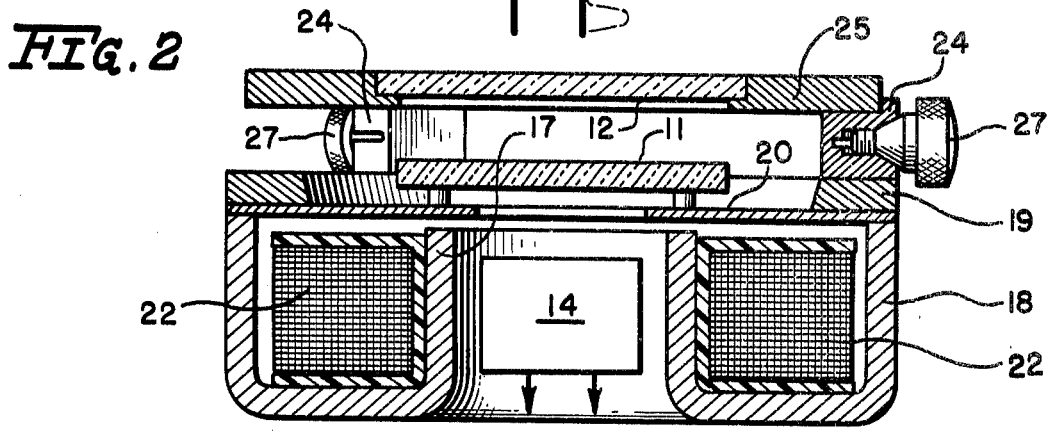
FIG. 2 is a cross-sectional side-elevational view of an intereference filter which may be employed in the system of FIG. 1.

As embodied herein, the spacing between mirrors 11 and 12 is varied electromagnetically. In FIG. 2, an electromagnetic driving apparatus includes a core of U-shaped cross-section having a coaxial inner and outer leg portions 17 and 18. The free end of outer leg 18 is slightly elevated over the free end of inner leg 17 between which photodetector 14 is disposed. Clamped by a spacer ring 19 to the outer core leg end is an annular disk 20 of flat, thin tool steel such as that from which saw blades are made. The inner peripheral edge of disk 20 is concentric with and approximately oriented above the inner leg 17. Annulus 20 is radially serrated from its inner perimeter so as to create a plurality of electromagnetic armatures in the form of individual strips. Nested within legs 17 and 18 is a coil 22. Mirror 11 is affixed to disk 20 in a position covering the opening therein. Secured on the top side of ring 19 are a plurality of adjustable spacers 24 on the upper side of which is secured a clamping ring 25 the inner circumference of which carries mirror 12. Spacers 24 are split horizontally to a substantial depth and include a tapered hole bottomed by a threaded section which receives a threaded slug 27. The depth of penetration of the slugs is adjustable for the purpose of aligning mirror 12 parallel with mirror 11. In practice it has been found that three adjustable spacers distributed circumferentially around the assembly 120° apart perform satisfactorily.

In operation, energization of coil 22 flexes disk 20 to move mirror 11 relative to mirror 12 while maintaining parallelism between the mirrors. Moreover, the primary energizing signal is alternating, but a direct-current bias also is caused to flow in coil 22 so that the alternating flux magnitude in the gaps between the core and annulus 20 varies about a point on a generally linear portion of the magnetic characteristic. This also avoids possible ambiguity in polarization between different coils when more than one is used as in push-pull arrangements.

Referring again to FIG. 1, detection of the rings produced by a source of coherent light is accomplished by varying the separation between mirrors 11, 12 by a minimum of one-half wavelength. In one system which has been operated, this variation constituted a linear motion several wavelengths long. For a constant linear motion of mirror 11, the frequency observed in the signal developed by detector 14 is determined by the wavelength $\lambda$ and the angle of incidence $\theta$. Consequently, in that system it is necessary to monitor a bandwidth somewhat over 1 octave wide, although the necessary instantaneous bandwidth is extremely low and typically of the order of only a few cycles per second. The detector current exhibits a signal-to-noise ratio in excess of ten when observing a spot ten feet away produced by a 0.6328 micron He-Ne laser having an output power of less than 1 milliwatt.

It is preferred, however, to change the mirror spacing d sinusoidally. In this manner, when spot 15 is produced by light of 1 micron wavelength (again a convenient value for illustration), a total excursion of 5 wavelengths results in the production of a 10 cycle-per-second signal by detector 14. In consequence of the sinusoidal motion, the detector produces a frequency modulated signal having side-bands which are multiples of the mechanical driving frequency up to a limit which is determined by the modulation index. It can be shown that the amplitude of these sidebands is given by the appropriate Bessel function and, depending upon such parameters as wavelengths, angle of incidence, and amplitude of vibration, there are different conditions when particular sidebands can and cannot exist. Therefore, if the signal processing circuitry is of the simplest variety which merely selects a single one of the sidebands, it is possible for the apparatus to have blind spots. There are, however, pairs of sidebands which cannot go to zero simultaneously. One such pair is composed of the second and third harmonics of the fundamental frequency. Accordingly, it is contemplated to take advantage of the existence of the detected f.m. signal spectrum for the purpose of producing an indication signal while at the same time taking steps to insure against the existence of blind spots. Moreover, the systems to be described also take advantage of the fact that the particular sidebands existing in the signal are a function of the source which drives mirror 11 to vary the mirror separation. As a result, those sidebands are independent of both the wavelength of the incident radiation and of its angle of origin. A change in the angle of origin does alter the modulation index and the distribution of the sidebands with increased higher order sidebands occurring upon movement of the origin away from axis 13.

Figure 3:
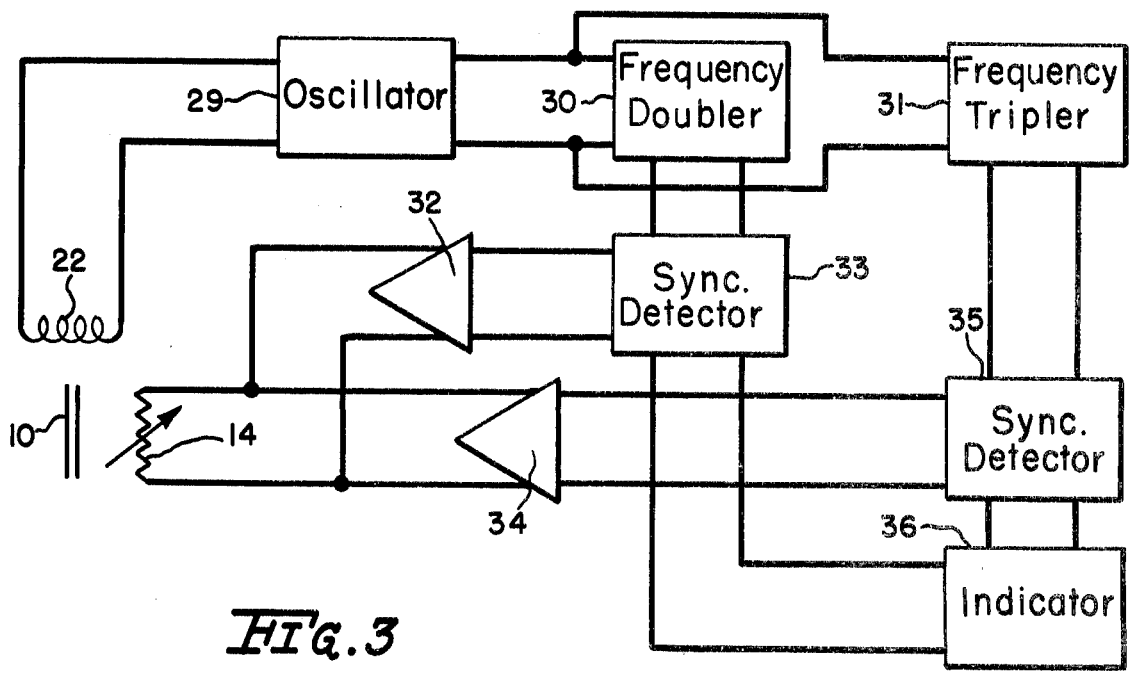
FIG. 3 is a schematic diagram of one complete embodiment of the present invention.

One such approach is illustrated in FIG. 3 wherein interference filter 10, detector 14 and driving coil 22 are represented schematically. Coil 22 is driven by signals from an oscillator 29 which also feeds a frequency doubler 30 and a frequency tripler 31. A first highly selective amplifier 32 is tuned to the second harmonic of the signal from oscillator 29 and feeds an amplified signal to a synchronous detector 33. Similarly, another sharply selective amplifier 34 responds to the third harmonic in the signal from detector 14 and feeds an amplified signal to a synchronous detector 35. The output signals from detectors 33 and 35 are fed in parallel to an indicator 36 which may be simply an alarm of either audible or visual nature. The alarm may be located at a remote position, if desired. Doubler 30 and tripler 31 each include adjustable phase delay networks so that the respective signals they feed to the detectors are in phase with the respective carrier signal harmonics derived by amplifiers 32 and 34.

Except for the purpose of eliminating possible blind spots as mentioned above, the basic principles are illustrated by considering the action only of amplifier 32, double 30 and synchronous detector 33. The system including the other synchronous detector 35 works the same way except for operation on the third harmonic; indicator 36 responds to an output signal from either synchronous detector. In one system using this approach, the nominal spacing between the elements of interference filter 10 is approximately 0.004" and oscillator 29 varies that spacing at a rate of approximately 300 cycles. Amplifier 32 thus is sharply selective of the second harmonic 600 cps signal. Correspondingly, doubler 30 develops a signal also of 600 cps and the two 600 cps signals are then fed into synchronous detector 33 in phase. The output signal from the synchronous detector exhibits an extremely high signal-to-noise ratio, with a very narrow bandwidth, the bandwith used in the particular system being in the order of 1 cycle. Comparable performance is obtained at several other harmonics and the system readily detects a laser beam spot produced by a laser output of 1 milliwatt at a range of 20 feet onto a scattering surface. Practical mechanical design limits this particular system to a field of view angle of about $\pm 30°$, although a $\pm 45°$ field of view at such a range is well within capability.

With respect to the light viewed by detector 14, it is to be observed that in the presence of coherent radiation a complex spectrum of harmonics of the modulation frequency appears in the detector output signal. At the same time, there are no such harmonics unless coherent radiation is present in the field of view and the optical passband of the interference filter. Consequently, incoherent background radiation is discriminated against by the technique. As described, the driving signal applied to the mirrors is the fundamental reference signal and this permits independent synchronous detection to be employed for any of the harmonics of the driving frequency. This makes available arbitrarily small post-detection bandwith.

It is desired that the peak-to-valley intensity of transmission difference of the interference filter be at least 50% so that each of the two mirrors should have an individual reflectance of approximately 40%; it is preferred that they maintain at least 30% transmission over a full octave in wavelength. In one successful application, the mirrors were fabricated of rutile on a quartz substrate, although the transmission bandwidth is slightly limited. A mirror material providing at least 30% reflectivity over a very large transmission range is the nickel alloy known as Inconel.

It is of course preferred that the photosensitive element of detector 14 have adequate wavelength response over the entire range, such as from 0.6 to 1.4 microns at room temperature, a sufficiently large sensitive area to be consistent with a large field of view, and adequate response time. While a silicon-junction photodetector has provided satisfactory response up to about 1.08 microns, the presently preferred detector utilizes lead sulfide as the active element and exhibits a room temperature response which extends well beyond 2 microns. Moreover, the lead sulfide photodetector has substantial detectivity for modulation components well beyond 1500 cycles per second, consistent with the driving-frequency harmonics involved.

The choice of driving frequency influences the sensitivity of the system. The driving signal frequency is limited at the low end by the desire to avoid 1/f noise which originates in the photodetector, amplifier and signal detector circuits. It is limited on the high end by the necessity for an adequate detectivity at the frequency corresponding to the highest harmonic of the modulation frequency being detected. Also, operation at harmonics of the local power line frequency is to be avoided.

A different approach to the signal processing and additional features are included in the alternative and preferred embodiment of FIG. 4 wherein interference filter 10, detector 14 and driving coil 22 for tuning the interference filter are indicated schematically the same as in FIG. 3. At the outset, the FIG. 4 system represents an improvement by virtue of the inclusion of a second photodetector element 40 identical with the element in detector 14 except that it is exposed only to the background radiation commonly falling on both detectors 14 and 40. The two detectors 14, 40 are coupled in push-pull across the split primary winding 41 of a transformer 42 the secondary winding 43 of which is coupled to the input terminals of a differential amplifier 44. Consequently, in the absence of a coherent light ring selected by interference filter 10, detectors 14 and 40 produce only identical background signals which are cancelled by the action of transformer 42 and differential amplifier 44.

The signal output from amplifier 44 is passed through a sharply selective filter 45 in this case peaked at 210 cps and having a passband of only about 6 cps. The signal output from filter 45 is further amplified in an amplifier 46 from which it is fed to a synchronous detector 47. The driving signals for the interference filter are developed by an oscillator 48 which in this case generates a driving signal of 105 cps which is fed through a highly selective filter 49 and raised in level by an amplifier 50. From amplifier 50, the driving signal is fed through a selected one of two resistors 51, 52 by way of a switch 53 to the input winding 54 of a transformer 55. From the secondary winding 56 of the latter the driving signal is fed through the one of another pair of resistors 57 and 58 selected by a switch 59. From the selected one of the latter resistors, the signal is fed by way of a DC potential source 60 to coil 22. Source 60 is for the purpose of applying the static bias to coil 22 as discussed above with respect to FIG. 2.

A second 105 cycle-per-second signal from oscillator 48 is fed through a frequency doubler 61 and a filter 62, sharply selective of the resultant 210 cps signal, to a trigger generator 63 by way of a phase shifter 64. In this case, generator 63 is of the well-known Schmidt variety, producing one pulse in phase correspondence with each cycle of the reference oscillation.

As in the embodiment of FIG. 3, the resultant demodulation component from detector 47 is fed to an indicator 66, in this instance by way of an amplifier 65 and an extremely low-frequency low-pass filter 67 composed of a series resistor 68 and a shunt capacitor 69. Filter 67 has a time constant of about 10 seconds so as to have a bandwidth of about 1/30th of a cycle per second. It will be observed that the noise bandwith therefore is restricted to the small value of 1/15 of a cycle per second.

In practice, and in view of theoretical reasons to be discussed, it has been found that the wavelength range may be extended still further by sequentially switching between two different amplitudes of the driving signal that varies the spacing of the interferometer mirrors 11, 12; that is, the range of wavelengths scanned by filter 10 is periodically varied. At the same time, a similar shift in the average spacing of mirrors 11 and 12 is incorporated into the system to shift the position of nulls in the sensitivity pattern of the output of the interference filter and thus to avoid the previously-mentioned blind spots; this is achieved by periodically changing the static bias applied to coil 22. With this latter approach, observation at only one harmonic is necessary. To these ends, the system of FIG. 4 further includes a timer 70 which operates switches 53 and 59. While a variety of timing mechanisms may be used for this purpose, it is convenient simply to employ a rotating cam shaft with the cam surfaces for the respective armatures of switches 53 and 59 correlated so that each of the four possible switch combinations is sequentially chosen. Such sequencing enables maximization of the amplitude of the observed harmonic throughout a very wide wavelength range while at the same time protecting against blind spots. In a typical embodiment, the duration of each sequence is approximately 45 seconds so that a full scan takes three minutes.

In each of the systems discussed, the basic approach is that of using a photodetector to examine a region of the interference filter where a fringe ring occurs upon the presence of coherent light having a frequency appropriate to be passed by the filter and then tuning the filter so as effectively to scan a wide range of possible wavelengths. The characteristic ring pattern appears and hence an output indication is given from the system only when coherent radiation within the designed wavelength range is present. While particular emphasis has been given herein to the detection of laser radiation, it is to be noted that the systems are likewise applicable in other environments. For example, certain stars emit particular characteristic lines in their spectrum and the principles disclosed are applicable therefore to star acquisition and tracking systems.

To understand more clearly the design parameters of the present system, it may be helpful to examine in more detail the transmission characteristic of the interference filter itself. The percentage transmittance T as a function of plate separation of a Fabry-Perot type interferometer as here employed with medium to low surface reflectance can be expressed:

$$T = T_o \left[ 1 + \alpha \cos \left( \frac{4\pi\delta \cos \theta}{\lambda} \right) \right], \quad (3)$$

where $T_o$ is the mean interferometer transmittance averaged over one cycle of the quantity $\cos(4\pi\delta \cos\theta/\lambda)$, $\alpha$ is the peak to zero excursion of transmittance as the value $\delta \cos \theta$ increases by $\frac{1}{8}$ of a wavelength, $\delta$ is the interferometer plate separation measured normal to the reflecting surfaces, $\lambda$ is the wavelength of the transmitted radiation and $\theta$ is the angle of incidence of the radiation on the interferometer. Equation (3) assumes that the plates are parallel and that the incident radiation is monochromatic and collimated. Also, the higher order cosine terms are neglected since these become significant only for higher surface reflectances than those of the embodied apparatus. The lower reflectance values actually utilized maximize the magnitude of $\alpha$.

When $\delta$ is given a time-varying modulation and the driving signal is at $\cos \omega_c t$, the transmission T can be expressed in the form:

$$T = T_o \left[ 1 + \alpha\cos \left[ \frac{4\pi\cos\theta (\Delta + \delta_o \sin\omega_c t)}{\lambda} \right] \right], \quad (4)$$

in which $\Delta$ is the mean normal interferometer spacing, $\delta_o$ is the peak-to-zero spacing modulation measured normal to the mirrors and $\omega_c$ is the modulation frequency. Equation (4) can be expanded to:

$$T = \quad (5)$$
$$T_o \left[ 1 + \alpha\cos \left( \frac{4\pi\cos\theta\Delta}{\lambda} \right) \cos \left( \frac{4\pi\cos\theta\delta_o}{\lambda} \sin\omega_c t \right) - \right.$$

$$\alpha \sin\left(\frac{4\pi\cos\theta\Delta}{\lambda}\right)\sin\left(\frac{4\pi\cos\theta\delta_o}{\lambda}\sin\omega_c t\right)\Bigg]$$

In turn, equation (5) can be further expanded to:

$$T = \tag{6}$$

$$T_o\Bigg[1 + \alpha\cos\phi_o\left\{J_o(\theta_o) + 2\sum_{n=1}^{n=\infty} J_{2n}(\theta_o)\cos 2n\omega_c t\right\} +$$

$$\alpha\sin\phi_o\left\{2\sum_{n=1}^{n=\infty} J_{(2n-1)}(\theta_o)\cos\sqrt{2n-1}\,\omega_c t\right\}\Bigg].$$

In equation (6), $\phi_o = 4\pi\cos\theta\Delta/\lambda$ minus the interferometer phase thickness and $\theta_o$ is the modulation index which is equal to the value $4\pi\cos\theta\delta_o/\lambda$ minus the peak-to-zero phase modulation. With the system operating only on the second harmonic of $\omega_c$ as in FIG. 4, for example, the effective transmittance can be written in the form $$T = T_o\alpha\cos\phi_o 2J_2(\theta_o)\cos 2\omega_c t \tag{7}$$

Examination of equation (7), and as verified by actual operation, reveals that it is the $\cos\phi_o$ term which results in sensitivity nulls in the field of view and this is the reason for either shifting the dc bias as in FIG. 4 or also looking at the third harmonic signal as in FIG. 3. The $\theta_o$ term determines the effective wavelength range. Again, it is to extend this range that the sequential change between resistors 51, 52 to in turn change the amplitude of the driving signal is incorporated into the FIG. 4 system.

Thus, the disclosed apparatus affords unique and useful information concerning the presence of absence of light anywhere within a wide spectral range by observing the particular characteristics of coherence. Its most widespread application, then, is to detect the presence within a given area of laser radiation. The disclosed systems are equally suitable for the detection of either visible or invisible radiation.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A system, which of itself, includes no source of coherent radiation, but which may produce an indication in the presence of such a source comprising:

a pair of parallel partially-reflective mirrors together defining an optical interference filter for responding to incident radiation originating from a source external to said system;

means for sinusoidally varying the spacing between said mirrors and correspondingly changing the transmission wavelengths of said mirrors and for developing a reference signal representative of the variation in said spacing;

means disposed on one side of said filter for detecting radiation transmittted therethrough to yield a detection signal; and means responsive to the simultaneous applications of said reference and detection signals for developing an indication signal.

2. A system, which of itself, includes no source of coherent radiation, but which may produce an indication in the presence of such a source comprising:

a pair of parallel partially-reflective mirrors together defining an optical interference filter for responding to incident radiation originating from a source external to said system;

means for varying the spacing between said mirrors and correspondingly changing the transmission wavelength of said mirrors and for developing a reference signal representative of the variation in said spacing;

means disposed on one side of said filter for detecting radiation transmitted therethrough to yield a detection signal;

means responsive to the simultaneous applications of said reference and detection signals for developing an indication signal;

said varying means including a reference signal source with said reference signal effecting the variation of said spacing and which further includes means for developing two different harmonics of said reference signal together with means coupled to said detecting means for selecting corresponding harmonic components of said detection signal, said system also including a first synchronous detector jointly responsive to respective first ones of the harmonics of said reference and detection signals and a second synchronous detector jointly responsive to the respective other ones of the harmonics of said reference and detection signals together with means coupled to the outputs of said synchronous detectors for developing an indication signal in response to the receipt of an output signal from either one or both of said synchronous detectors.

3. A system, which of itself, includes no source of coherent radiation, but which may produce an indication in the presence of such a source comprising:

a pair of parallel partially-reflective mirrors together defining an optical interference filter for responding to incident radiation originating from a source external to said system;

means for varying the spacing between said mirrors and correspondingly changing the transmission wavelength of said mirrors and for developing a reference signal representative of the variation in said spacing and wherein said means for varying the spacing between said mirrors comprises means responsive to an applied signal for varying said spacing, and in which said reference signal is applied to said means for varying said spacing and further including means for periodically changing the amplitude of said reference signal as applied to said means for varying said spacing;

means disposed on one side of said filter for detecting radiation transmitted therethrough to yield a detection signal; and means responsive to the simultaneous applications of said reference and detection signals for developing an indication signal.

4. A system, which of itself, includes no source of coherent radiation, but which may produce an indication in the presence of such a source comprising:

a pair of parallel partially-reflective mirrors together defining an optical interference filter for responding to incident radiation originating from a source external to said system;

means for varying the spacing between said mirrors and correspondingly changing the transmission wavelength of said mirrors and for developing a reference signal representative of the variation in said spacing, said varying means further including an element for periodically changing the action of said varying means from a variation between a first pair of spacings to a variation between a second and different pair of spacings:

means disposed on one side of said filter for detecting radiation transmitted therethrough to yield a detection signal; and means responsive to the simultaneous applications of said reference and detection signals for developing an indication signal.

5. A system, which of itself, includes no source of coherent radiation, but which may produce an indication in the presence of such a source comprising:

a pair of parallel partially-reflective mirrors together defining an optical interference filter for responding to incident radiation originating from a source external to said system;

means for varying the spacing between said mirrors and correspondingly changing the transmission wavelength of said mirrors and for developing a reference signal representative of the variation in said spacing;

means disposed on one side of said filter for detecting radiation transmitted therethrough to yield a detection signal;

means responsive to the simultaneous applications of said reference and detection signals for developing an indication signal; and a second means for detecting radiation transmitted through said filter, together with means for producing a detection signal only in response to the background radiation in the location of said system and means for utilizing the detection signal of said second means for cancelling the contribution of background radiation to the detection means disposed on said one side of said filter.

6. A system, which of itself, includes no source of coherent radiation, but which may produce an indication in the presence of such a source comprising:

a pair of parallel partially-reflective mirrors together defining an optical interference filter for responding to incident radiation originating from a source external to said system;

means for varying the spacing between said mirrors and correspondingly changing the transmission wavelength of said mirrors and for developing a reference signal representative of the variation in said spacing;

means disposed on one side of said filter for detecting radiation transmitted therethrough to yield a detection signal;

means responsive to the simultaneous applications of said reference and detection signals for developing an indication signal;

said varying means further including a source productive of said reference signal and means for utilizing said reference signal to vary said spacing, said system further including means for generating a harmonic of said reference signal and means responsive to said detection signal for selecting the same harmonic thereof together with a synchronous detector responsive to said harmonics of said reference and detection signals for developing an output signal.

7. The system as defined in claim 6 in which the output signal from said synchronous detector is fed through a low-pass, low-frequency filter to an indicator of signal energy passed by said low-frequency filter.